(12) United States Patent
Chen

(10) Patent No.: US 10,656,904 B2
(45) Date of Patent: May 19, 2020

(54) METHOD FOR ADJUSTING SOUND VOLUME OF TERMINAL, TERMINAL, AND NON-TRANSITORY TANGIBLE COMPUTER-READABLE STORAGE MEDIUM

(71) Applicant: JRD COMMUNICATION (SHENZHEN) LTD, Shenzhen, Guangdong (CN)

(72) Inventor: Jianqiang Chen, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 0 days.

(21) Appl. No.: 16/261,560

(22) Filed: Jan. 29, 2019

(65) Prior Publication Data

US 2019/0155567 A1 May 23, 2019

Related U.S. Application Data

(63) Continuation of application No. PCT/CN2017/094126, filed on Jul. 24, 2017.

(30) Foreign Application Priority Data

Aug. 1, 2016 (CN) .......................... 2016 1 0617852

(51) Int. Cl.
*G06F 3/16* (2006.01)
*H04M 1/725* (2006.01)
*G06F 3/0484* (2013.01)
*G06F 3/0488* (2013.01)
*H04B 1/3827* (2015.01)

(52) U.S. Cl.
CPC .......... *G06F 3/165* (2013.01); *G06F 3/04847* (2013.01); *G06F 3/04883* (2013.01); *H04M 1/72519* (2013.01); *H04M 1/72569* (2013.01); *H04B 1/3827* (2013.01)

(58) Field of Classification Search
CPC .. G06F 3/165; G06F 3/04847; G06F 3/04883; H04M 1/725; H04B 1/3827
See application file for complete search history.

(56) References Cited

U.S. PATENT DOCUMENTS

| 2014/0099992 A1* | 4/2014 | Burns ..................... G06F 3/044 |
| | | 455/550.1 |
| 2014/0253775 A1 | 9/2014 | Kim et al. | |

FOREIGN PATENT DOCUMENTS

| CN | 101931694 A | 12/2010 |
| CN | 103076979 A | 5/2013 |
| CN | 103558970 A | 2/2014 |

* cited by examiner

*Primary Examiner* — Andrew L Sniezek

(57) ABSTRACT

A method for adjusting a sound volume of a terminal, a terminal and a non-transitory tangible computer-readable storage medium are disclosed. The method may include: detecting a sliding action generated by triggering a touch screen in real time when the terminal is in a calling state, and determining whether the sliding action is valid; when the sliding action is valid, acquiring a first projection of the sliding track in a horizontal direction and a second projection in a vertical direction; and adjusting the sound volume based on a preset correspondence between the first and second projections and the sound volume.

17 Claims, 3 Drawing Sheets

METHOD FOR ADJUSTING SOUND VOLUME OF TERMINAL, TERMINAL, AND NON-TRANSITORY TANGIBLE COMPUTER-READABLE STORAGE MEDIUM

CROSS REFERENCE TO RELATED APPLICATIONS

The present application is a continuation-application of International (PCT) Patent Application No. PCT/CN2017/094126 filed on Jul. 24, 2017, which claims foreign priority of Chinese Patent Application No. 201610617852.4, filed on Aug. 1, 2016, the entire contents of which are hereby incorporated by reference in their entireties.

TECHNICAL FIELD

The present disclosure relates to the field of intelligent terminals, and in particular, to a method for adjusting a sound volume of a terminal, a terminal and a non-transitory tangible computer-readable storage medium.

BACKGROUND

With continuous developments of terminals, more and more intelligent devices support call functions. In addition, in order to prevent accidental touch during calls, the intelligent devices will mostly display black screens and cannot respond to the touch from users. At this time, if the users want to adjust sound volumes of the calls, it is usually necessary to manually press volume up keys and volume down keys. In this way, the lives of the volume keys will be shorten over time. Meanwhile, in some terminals, the volume keys are arranged in some positions such that the volume keys are capable of being pressed only after the terminals are moved away from ears, which is inconvenient for the users to use, and which brings great inconvenience during the calls. In addition, for existing terminals, only the sound volumes of earpieces can be adjusted during the calls, and the sound volumes of microphones cannot be adjusted. Therefore, when the sound volumes of the earpieces are adjusted to the maximum, the users can only raise or lower their sounds to make others heard, which brings great inconvenience to the users.

Therefore, it needs to make improvements and increase to the related art.

SUMMARY

A technical problem solved by the present disclosure is to provide a method and a system for adjusting a sound volume of a terminal, the terminal and a non-transitory tangible computer-readable storage medium, which can solve the problems in the related art that the sound volume can be adjusted only by the volume keys during calls and it is inconvenient for the user.

To solve the above technical problem, the present disclosure adopts technical solutions as below.

A method for adjusting a sound volume of a terminal may be provided. The method may include: detecting a sliding action generated by triggering a touch screen of the terminal in real time when the terminal is in a calling state, and determining whether the sliding action is valid; when the sliding action is determined to be valid, acquiring a first projection of the sliding track in a horizontal direction and a second projection in a vertical direction; and acquiring a sound volume adjustment mode corresponding to the first and second projections based on a preset correspondence between the first and second projections and the sound volume, and adjusting the sound volume based on the sound volume adjustment mode.

A terminal may be further provided. The terminal may include a touch screen and a processor having programs stored therein; wherein the processor is configured to: detect a sliding action generated by triggering the touch screen in real time when the terminal is in a calling state, and determine whether the sliding action is determined to be valid; acquire a first projection of the sliding track in a horizontal direction and a second projection in a vertical direction when the sliding action is valid; and adjust the sound volume based on a preset correspondence between the projection and the sound volume.

A non-transitory tangible computer-readable storage medium for storing computer program code may be further provided. When the computer program code is executed by a processor, causes the processor to execute a method for adjusting a sound volume of a terminal. The method may include: detecting a sliding action generated by triggering a touch screen of the terminal in real time when the terminal is in a calling state, and determining whether the sliding action is valid; when the sliding action is determined to be valid, acquiring a first projection of the sliding track in a horizontal direction and a second projection in a vertical direction; and acquiring a sound volume adjustment mode corresponding to the first and second projections based on a preset correspondence between the first and second projections and the sound volume, and adjusting the sound volume based on the sound volume adjustment mode.

DETAILED DESCRIPTION

The present disclosure provides a method and system for adjusting sound volume of a terminal. In order to make the objective, the technical solutions and the technical effects of the present disclosure more clearly, the present disclosure will be further described in detail below with reference to the accompanying drawings and embodiments. It should be understood that, the specific embodiments described herein are merely illustrative of the present disclosure, and are not intended to limit the present disclosure.

In the present disclosure, terms used herein for indicating elements, such as "module", "component", or "unit", are merely for explanation, and do not have specific meanings per se. Thus, "modules", "components", or "units" can be used in combination.

The terminal can be implemented in various forms. For example, the terminal described in the present disclosure may include a mobile terminal (such as, a mobile phone, a smart phone, a notebook computer, a digital broadcast receiver, a PDA (Personal Digital Assistant), a PAD (Tablet), a PMP (Portable Multimedia Player), a navigation device, and the like) and a stationary terminal (such as a digital TV, a desktop computer, and the like). However, it should be understood by those skilled in the art that, configurations in accordance with embodiments of the present disclosure can also be applied to terminals of fixed types, except for being specifically applied to mobile components.

The present disclosure will be further described by the following description of embodiments with reference to the accompanying drawings.

Figure 1:
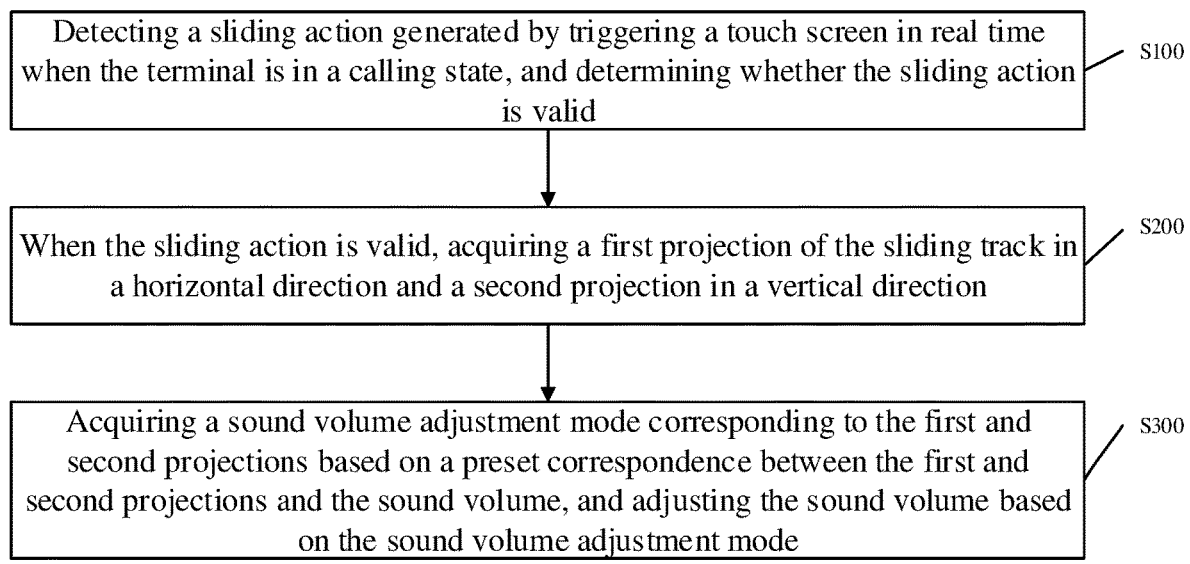
FIG. 1 is a flowchart of a method for adjusting a sound volume of a terminal according to some embodiments of the present disclosure.

FIG. 1 is a flowchart of a method for adjusting a sound volume of a terminal according to some embodiments of the present disclosure. The method may include operations executed by the following blocks.

At block S100, when the terminal is in a calling state, a sliding action generated by triggering a touch screen may be detected in real time, and whether the sliding action is valid may be determined.

More specifically, the terminal being in the calling state refers that, a call may be made between the terminal and other terminals having a call function by using the call function. When the terminal is in the calling state, the sliding action generated by triggering the touch screen may be detected in real time. The sliding action may be generated by a touch event input to the touch screen from a user.

Since the terminal generally display a black screen when the terminal is in the calling state, the sliding action generated by touching the touch screen will not be responded. Thus, when the sliding action is detected, whether the sliding action is valid should also be determined. A valid may be a triggering instruction configured to trigger the terminal to perform subsequent adjustments. That is, the terminal may receive the sliding action and adjust the sound volume accordingly based on the sliding action only when the sliding action is valid. In some embodiments, determining whether the sliding action is valid may include operations executed by the following blocks.

At block S101, when the terminal is in the calling state, the sliding action generated by triggering the touch screen may be detected in real time.

More specifically, detecting the sliding action generated by touching the touch screen in real time refers to detecting the sliding action generated by a sliding event on the touch screen from the user. That is, the sliding action is a touch action generated by continuously touching the touch screen.

At block S102, when the sliding action is detected, a sliding track of the sliding action may be acquired.

More specifically, when the sliding action is detected, the sliding track formed on the touch screen by the sliding action may be acquired. In some embodiments, the sliding track may be a touching track formed by touching the touch screen. The sliding track may be acquired by acquiring touch points generated by the sliding action on the touch screen, and calculating the sliding track corresponding to the sliding action based on the touch points. Acquiring the sliding track may include operations executed by the following blocks.

At block S1021, when the sliding action is detected, coordinates of the touch points corresponding to the sliding action may be acquired.

More specifically, when the sliding action is detected, the coordinates of the touch points corresponding to the sliding action may be acquired in real time. In practical applications, when the sliding action is detected, coordinates respectively of a starting point and a second point may be firstly acquired and further stored. When a coordinate of a third point is acquired, the coordinate of the third point is used to replace and update the coordinate of the second point which has been stored before. That is to say, at any moment of the sliding action, only the coordinate of the starting point and that of the current point need to be stored, such that the terminal needs to store less touch points, and thus the storage space of the terminal may be saved. Besides, the energy consumption may also be reduced, and the service life of the terminal may be extended as a result.

At block S1022, the length of the sliding track corresponding to the sliding action may be calculated based on the coordinates of the touch points. In some embodiments, the sliding track may be a line segment formed by the starting point and the current point.

More specifically, calculating the length of the sliding track corresponding to the sliding action based on the coordinates of the touch points refers to calculating the length of sliding track based on the stored coordinates of the starting point and the current point, that is, the sliding track may be a line segment formed by the starting point and the current point. Herein, the coordinate of the starting point may be set as (x1, y1), and the coordinate of the current point may be set as (x2, y2), then the length of the current valid sliding track may be calculated as follow.

$$L=\sqrt{(x2-x1)^2-(y2-y1)^2}.$$

At block S103, the sliding track may be compared with a preset threshold in length to determine whether the sliding action is valid. When the length of the sliding track is greater than or equal to the preset threshold, it is determined that the sliding action is valid.

More specifically, comparing the length of the sliding track with the preset threshold refers to comparing the length L formed by the coordinate of the starting point and the coordinate of the current point with the preset threshold, in order to determine whether the sliding action corresponding to the sliding track is valid. In this way, it is possible to prevent the misoperation caused by the user accidentally touching the touch screen.

The preset threshold may be a preset threshold value configured to determine whether the sliding action is valid. When the length of the sliding track is greater than or equal to the preset threshold, it may be determined that the sliding action is valid. However, when the length of the sliding track is less than the preset threshold, it may be determined that the sliding action is invalid, and no response may be made. The preset threshold may be set by the system by default, or may be set by the user on setting interface of the terminal as required. For example, the preset threshold may be set as 2.5 cm and the like.

Further, based on the calculation method of the sliding track, when the touch points corresponding to the sliding action are different, the directions and the lengths of the sliding tracks may also change correspondingly, and the lengths may also be reduced. Therefore, in some embodiments, during the process of determining whether the sliding action is valid, when the length of the sliding track is greater than or equal to the preset threshold, it may be determined that the sliding action is valid. Herein, the length of the sliding track being greater than or equal to the preset threshold value refers that the length of the sliding track stored during the sliding action may be greater than or equal to the preset threshold value, and in this case, it may be determined that the sliding action is valid. In this way, it is possible to reduce the accuracy requirements of the sliding track, and it is convenient for the user.

At block S200, when the sliding action is valid, a first projection of the sliding track in a horizontal direction and a second projection in a vertical direction may be acquired.

More specifically, when the sliding action is valid, the sliding action may be interpreted and subsequent processes may be performed to the sliding action. The subsequent processes may include the following. The sliding track may be projected in the horizontal direction and the vertical direction, the directions and the lengths of the first and second projections, and the sound volume may be adjusted correspondingly based on the directions and the lengths of the first and second projections. The specific processes may include operations executed by the following blocks.

At block S201, when the sliding action is valid, the sliding track may be projected in the horizontal direction and the vertical direction respectively.

At block S202, the directions and the lengths of the first projection in the horizontal direction and the second projection in the vertical direction may be calculated based on the sliding track.

Projecting the sliding track in the horizontal direction and the vertical direction respectively refers to projecting the line segment formed by the starting point and the current point in the horizontal direction and the vertical direction, and acquiring the directions and the lengths of the first projection of the line segment in the horizontal direction and the second projection in the vertical direction. Herein, the direction refers to the direction of the projection of the line segment. More specifically, the direction of the first projection of the line segment in the horizontal direction is acquired by determining whether the projection of the line segment is leftward or rightward, and the direction of the second projection of the line segment in the vertical direction is acquired by determining whether the projection of the line segment is upward or downward. That is to say, the direction of the first projection of the line segment in the horizontal direction may include left and right, and the direction of the second projection of the line segment in the vertical direction may include up and down. The length refers to the length of the projection of the line segment.

After acquiring the directions and the lengths of the first projection of the sliding track in the horizontal direction and the second projection in the vertical direction, the sound volume may be adjusted correspondingly based on the directions and the lengths of the first projection of the sliding track in the horizontal direction and the second projection in the vertical direction. The sound volume may include the sound volume of the earpiece and that of the microphone.

At block S300, a sound volume adjustment mode corresponding to the first and second projections may be acquired based on a preset correspondence between the first and second projections and the sound volume, and the sound volume may be adjusted based on the sound volume adjustment mode.

More specifically, acquiring the sound volume adjustment mode corresponding to the first and second projections based on the preset correspondence between the first and second projections and the sound volume refers to acquiring a sound volume adjustment mode corresponding to the first and the second projections based on the preset correspondence between the direction of the projection and the sound volume.

For example, acquiring the sound volume adjustment mode corresponding to the first and second projections based on the preset correspondence between the first and second projections and the sound volume may include operations executed by the following blocks.

At block S301, the length of the second projection in the vertical direction may be subtracted from the length of the first projection in the horizontal direction, and a valid projection of the sliding track may be determined based on whether the subtraction result is positive or negative. In some embodiments, the valid projection may be the first projection in the horizontal direction or the second projection in the vertical direction.

More specifically, subtracting the length of the second projection in the vertical direction from the length of the first projection in the horizontal direction may refer to subtracting the length of the vertical component of the sliding track from the length of the horizontal component of the sliding track, and determining whether the first projection in the horizontal direction or the second projection in the vertical direction is the valid projection based on the subtraction result. When the subtraction result is positive, it may be determined that the first projection in the horizontal direction is the valid projection. However, when the subtraction result is negative, it may be determined that the second projection in the vertical direction is the valid projection.

Further, subtracting the length of the second projection in the vertical direction from the length of the first projection in the horizontal direction may also be achieved by the following operations. The stored coordinate of the starting point and that of the current point may be read; the line segment of the sliding track may be acquired based on the coordinate of the starting point and that of the current point; a first variation of the first projection of the sliding track may be defined as $\Delta x$, and a second variation of the second projection of the sliding track may be defined as $\Delta y$, the first variation and the second variation may be calculated, wherein $\Delta x=x2-x1$, $\Delta y=y2-y1$; an absolute value of $\Delta y$ may be subtracted from an absolute value $\Delta x$, such that the length of the first projection in the horizontal direction may be compared with the length of the second projection in the vertical direction. If $|\Delta x|>|\Delta y|$, the sliding action may be considered as a horizontal left-right slipping. However, if $|\Delta y|\geq|\Delta x|$, the sliding action may be considered as a vertical up-down slipping.

Further, whether the differences are positive or negative may be determined based on the comparison result, and the sound volume adjustment mode may be determined based on the determination result whether the differences are positive or negative. For example, the difference $\Delta x$ may be compared with 0. When $\Delta x>0$, the sliding action may be considered as the horizontal right slipping; however, when $\Delta x<0$, the sliding action may be considered as the horizontal left slipping. Likewise, the difference $\Delta y$ may be compared with 0. When $\Delta y>0$, the sliding action may be considered as the vertical upward slipping; however, when $\Delta y<0$, the sliding action may be considered as the vertical downward slipping.

At block S302, the sound volume adjustment mode corresponding to the direction of the valid projection may be determined based on the correspondence between the first and second projections and the sound volume adjustment, and the sound volume may be adjusted based on the sound volume adjustment mode.

More specifically, after determining the direction of the valid projection, the sound volume adjustment mode corresponding to the direction of the valid projection may be determined based on the correspondence between the first and second projections and the sound volume adjustment mode, and the sound volume may be adjusted based on the sound volume adjustment mode.

For example, the correspondence between the first and second projections and the sound volume adjustment mode may include the following.

When the projection is horizontally to the left, the sound volume of the microphone may be reduced.

When the projection is horizontally to the right, the sound volume of the microphone may be increased.

When the projection is vertically up, the sound volume of the earpiece may be reduced.

When the projection is vertically down, the sound volume of the earpiece may be reduced.

Correspondingly, the projection may be the first projection of the sliding track generated by the sliding action in the horizontal direction or the second projection of the sliding track generated by the sliding action in the vertical direction, such that the correspondence between the sliding action and the sound volume adjustment mode can be acquired based on the correspondence between the first and second projections and the sound volume adjustment mode. More specifically, the correspondence between the sliding action and the sound volume adjustment mode may include the following.

When the sliding action is the horizontal left slipping, the sound volume of the microphone may be reduced.

When the sliding action is the horizontal right slipping, the sound volume of the microphone may be increased.

When the sliding action is the vertical upward slipping, the sound volume of the earpiece may be reduced.

When the sliding action is the vertical downward slipping, the sound volume of the earpiece may be reduced.

Therefore, in practical applications, the sound volume can be adjusted correspondingly by controlling the direction of the sliding action. The controlling modes may include the following.

If a user currently wants to reduce the sound volume of the microphone, the user slides to the left in the horizontal direction; in this way, $|\Delta x| > |\Delta y|$, and $\Delta x < 0$. Therefore, based on the direction of the valid projection of the sliding track, it can be determined that the user wants to reduce the sound volume of the microphone, and thus the operation of reducing the sound volume of the microphone may be executed.

If the user currently wants to increase the sound volume of the microphone, the user slides to the right in the horizontal direction; in this way, $|\Delta x| > |\Delta y|$, and $\Delta x > 0$. Therefore, based on the direction of the valid projection of the sliding track, it can be determined that the user wants to increase the sound volume of the microphone, and thus the operation of increasing the sound volume of the microphone may be executed.

If the user currently wants to reduce the sound volume of the earpiece, the user slides downwardly in the vertical direction; in this way, $|\Delta y| \geq |\Delta x|$, and $\Delta y < 0$. Therefore, based on the direction of the valid projection of the sliding track, it can be determined that the user wants to reduce the sound volume of the earpiece, and thus the operation of reducing the sound volume of the earpiece may be executed.

If the user currently wants to increase the sound volume of the earpiece, the user slides upwardly in the vertical direction; in this way, $|\Delta y| \geq |\Delta x|$, and $\Delta y > 0$. Therefore, based on the direction of the valid projection of the sliding track, it can be determined that the user wants to increase the sound volume of the earpiece, and thus the operation of increasing the sound volume of the earpiece may be executed.

Figure 2:
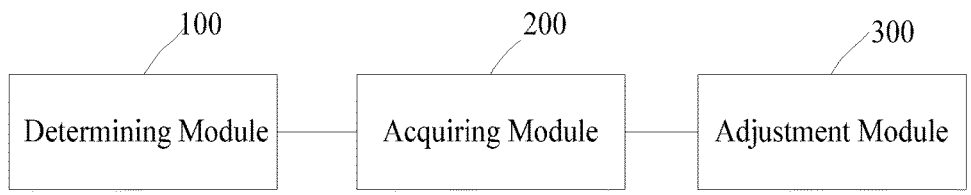
FIG. 2 is a schematic structural diagram of a system for adjusting sound volume of a terminal according to some embodiments of the present disclosure.
Figure 3:
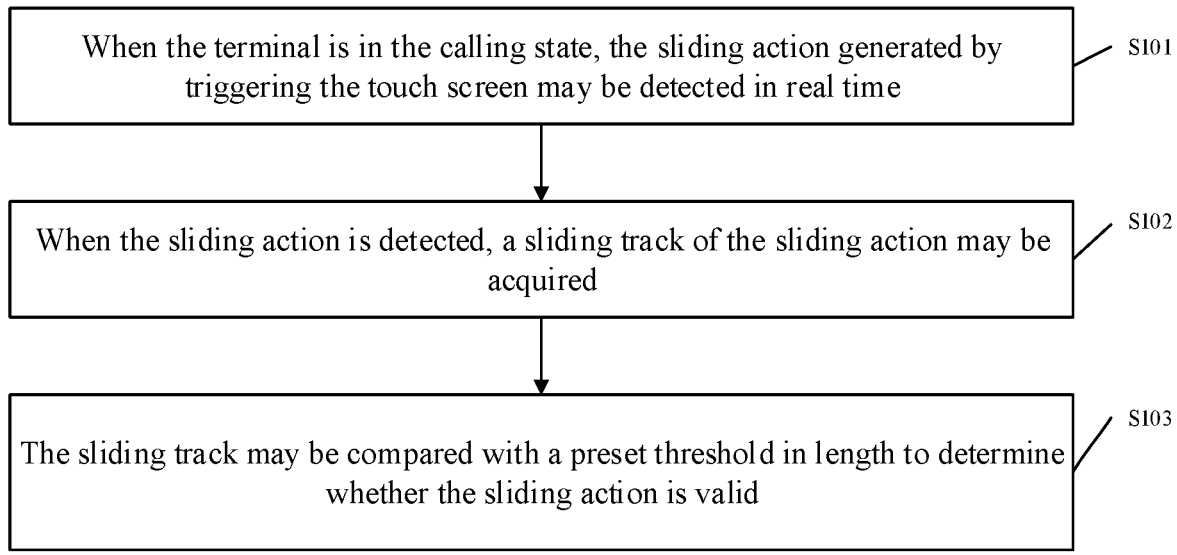
FIG. 3 is a flowchart of a method for detecting a sliding action and determining whether the sliding action is valid according to some embodiments of the present disclosure.
Figure 4:
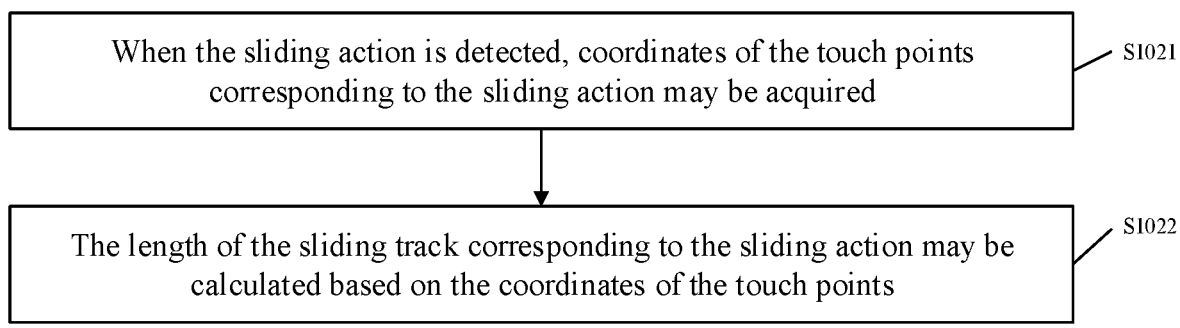
FIG. 4 is a flowchart of a method for acquiring a sliding track of the sliding action according to some embodiments of the present disclosure.
Figure 5:
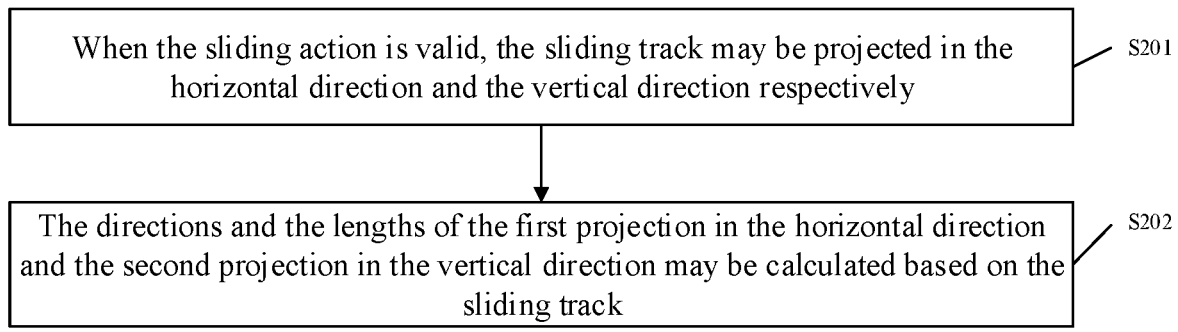
FIG. 5 is a flowchart of a method for acquiring a first projection of the sliding track in a horizontal direction and a second projection in a vertical direction according to some embodiments of the present disclosure.
Figure 6:
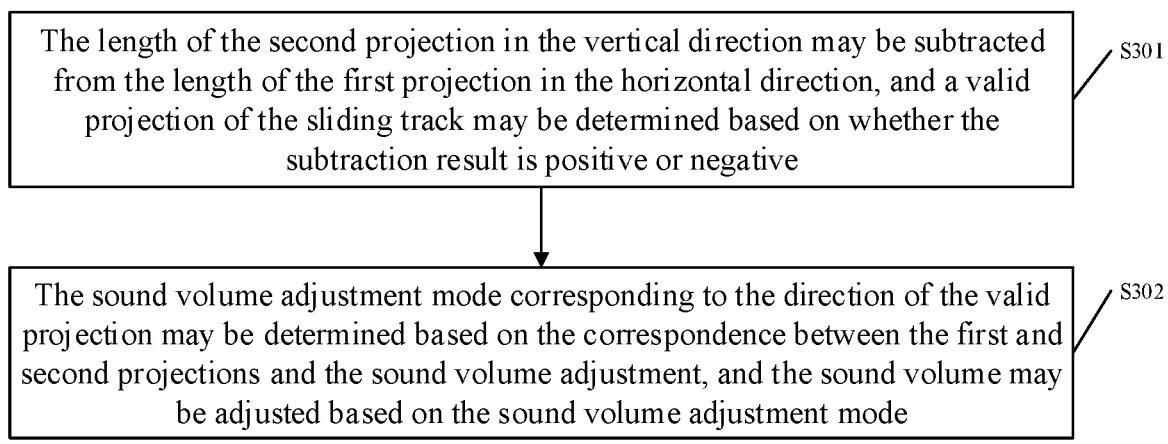
FIG. 6 is a flowchart of a method for acquiring sound volume adjustment mode and adjusting the sound volume according to some embodiments of the present disclosure.

The present disclosure also provides a system for adjusting a sound volume of the terminal. As shown in FIG. 2, the system may include a determining module 100, an acquiring module 200, and an adjustment module 300.

The determining module 100 may be configured to detect a sliding action generated by triggering a touch screen in real time when the terminal is in a calling state, and determine whether the sliding action is valid.

The acquiring module 200 may be configured to acquire a first projection of the sliding track in a horizontal direction and a second projection in a vertical direction when the sliding action is valid.

The adjustment module 300 may be configured to adjust the sound volume based on a preset correspondence between the first and second projections and the sound volume.

In some embodiments, in the system for adjusting the sound volume of the terminal, the determining module may specifically include a detecting unit, an acquiring unit, and a determining unit.

The detecting unit may be configured to detect the sliding action generated by triggering the touch screen in real time when the terminal is in the calling state.

The acquiring unit may be configured to acquire a sliding track of the sliding action when the sliding action is detected.

The determining unit may be configured to compare sliding track with a preset threshold in length to determine whether the sliding action is valid, and determine that the sliding action is valid when the length of the sliding track is greater than or equal to the preset threshold.

In some embodiments, in the system for adjusting the sound volume of the terminal, the acquiring unit may specifically include an acquiring subunit and a calculation subunit.

The acquiring subunit may be configured to acquire coordinates of touch points corresponding to the sliding action when the sliding action is detected.

The calculation subunit may be configured to calculate the length of the sliding track corresponding to the sliding action based on the coordinates of the touch points, wherein the sliding track is a line segment formed by a starting point and a current point.

In some embodiments, in the system for adjusting the sound volume of the terminal, the acquiring module may specifically include a projection unit and a calculation unit.

The projection unit may be configured to project the sliding track in a horizontal direction and a vertical direction when the sliding action is valid.

The calculation unit may be configured to calculate directions and lengths of the first projection in the horizontal direction and the second projection in the vertical direction based on the sliding track.

In some embodiments, in the system for adjusting the sound volume of the terminal, the adjustment module may specifically include a determining unit and an adjusting unit.

The determining unit may be configured to subtract the length of the second projection in the vertical direction from the length of the first projection in the horizontal direction, and determine a valid projection of the sliding track based on a determination whether the subtraction result is positive or negative. In some embodiments, the valid projection is the first projection in the horizontal direction or the second projection in the vertical direction.

The adjusting unit may be configured to determine a sound volume adjustment mode corresponding to the direction of the valid projection based on the correspondence between the first and second projections and the sound volume adjustment, and adjust the sound volume based on the sound volume adjustment mode.

In a further aspect, a terminal may be further provided. The terminal may include a touch screen and a processor having programs stored therein. The memory may be configured to: detect a sliding action generated by triggering the touch screen in real time when the terminal is in a calling state, and determine whether the sliding action is determined to be valid; acquire a first projection of the sliding track in a horizontal direction and a second projection in a vertical direction when the sliding action is valid; and adjust the sound volume based on a preset correspondence between the projection and the sound volume.

In some embodiments, the processor may be further configured to: detect the sliding action generated by triggering the touch screen in real time when the terminal is in the calling state; acquire a sliding track of the sliding action when the sliding action is detected; and compare the sliding track with a preset threshold in length to determine whether the sliding action is valid; wherein when the length of the sliding track is greater than or equal to the preset threshold, the sliding action is determined to be valid.

In some embodiments, the processor may be further configured to: acquire coordinates of touch points corresponding to the sliding action when the sliding action is detected; and calculate the length of the sliding track corresponding to the sliding action based on the coordinates of the touch points, wherein the sliding track is a line segment formed by a starting point and a current point.

In some embodiments, the processor may be further configured to: project the sliding track in a horizontal direction and a vertical direction when the sliding action is valid; and calculate directions and lengths of the first projection in the horizontal direction and the second projection in the vertical direction based on the sliding track.

In some embodiments, the processor may be further configured to: subtract the length of the second projection in the vertical direction from the length of the first projection in the horizontal direction, and determine a valid projection of the sliding track based on a determination whether the subtraction result is positive or negative; wherein the valid projection is the first projection in the horizontal direction or the second projection in the vertical direction; and determine a sound volume adjustment mode corresponding to the direction of the valid projection based on the correspondence between the first and second projections and the sound volume adjustment, and adjust the sound volume based on the sound volume adjustment mode.

In some embodiments, a first variation of the first projection of the sliding track may be defined as $\Delta x$, and a second variation of the second projection of the sliding track may be defined as $\Delta y$, and $\Delta x = x2 - x1$, $\Delta y = y2 - y1$. When $|\Delta x| > |\Delta y|$ and $\Delta x > 0$, the sliding action may be determined to be a horizontal right slipping; when $|\Delta x| > |\Delta y|$ and $\Delta x < 0$, the sliding action may be determined to be a horizontal left slipping. When $|\Delta y| > |\Delta x|$ and $\Delta y > 0$, the sliding action may be determined to be a vertical upward slipping; and when $|\Delta y| > |\Delta x|$ and $\Delta y < 0$, the sliding action may be determined to be a vertical downward slipping.

In some embodiments, the terminal may further include a microphone and an earpiece; wherein the processor may be further configured to: when the sliding action is the horizontal left slipping, reduce the sound volume of the microphone; when the sliding action is the horizontal right slipping, increase the sound volume of the microphone; when the sliding action is the vertical upward slipping, reduce the sound volume of the earpiece; and when the sliding action is the vertical downward slipping, increase the sound volume of the earpiece.

In a further aspect, a non-transitory tangible computer-readable storage medium for storing computer program code may be further provided. When the computer program code is executed by a processor, causes the processor to execute the method for adjusting the sound volume of the terminal as described above. In the embodiments provided by the present disclosure, it should be understood that the disclosed system and method may be implemented in other manners. For example, the device embodiments described above are merely illustrative. For example, the division of the modules is based solely on logic functions. In actual implementations, there may be other division manners, for example, multiple units or components may be combined or integrated into another system, or some features can be ignored or not executed. In addition, mutual couplings, direct couplings, or communication connections shown or discussed herein may be indirect couplings or communication connections through some interfaces, devices or units, and may be achieved electrically, mechanically, or in other forms.

The units described as separate components may or may not be physically separated. The components displayed as units may or may not be physical units, that is, may be located in one place, or may be distributed to multiple network units. Some or all of the units may be selected based on actual needs to achieve the objectives of the solution of the embodiment.

In addition, each functional unit in each embodiment of the present disclosure may be integrated into one processing unit, presented as various physically separated unit, or two or more units may be integrated into one unit. The above integrated units may be implemented by hardware, or may be implemented as software and hardware functional units.

If the above-described integrated units are implemented as software and hardware functional units, they can be stored in a computer readable storage medium. The software functional units described above may be stored in a storage medium and include multiple instructions enabling a computing device (e.g., a personal computer, a server, a network device, etc.) or a processor to execute all or part of the methods as described in various embodiments. The storage medium may include all kinds of media that can store program codes, such as a USB flash disk, mobile hard drive, Read-Only Memory (ROM), Random Access Memory (RAM), magnetic disk, or optical disk.

It should be noted that the above embodiments are only used to illustrate the technical solutions of the present disclosure, and but are not meant to limit the scope of the disclosure. Although the present disclosure has been described in detail with reference to the foregoing embodiments, those skilled in the art should understand that they can still make many modifications to the technical solutions described in the foregoing embodiments, or makes equivalents of parts of the technical features. These modifications or equivalents will not make the technical solution of the present disclosure departing from the spirit and protection scope of the technical solution in various embodiments of the present disclosure.

What is claimed is:

1. A method for adjusting a sound volume of a terminal, comprising:

detecting a sliding action generated by triggering a touch screen of the terminal in real time whet the terminal is in a calling state, and determining whether the sliding action is valid;

when the sliding action is determined to be valid, acquiring a first projection of a sliding track of the sliding action in a horizontal direction and a second projection of the sliding track of the sliding action in a vertical direction; and acquiring a sound volume adjustment mode corresponding to the first and second projections based on a preset correspondence between the first and second projections and the sound volume, and adjusting the sound volume based on the sound volume adjustment mode;

wherein the acquiring the sound volume adjustment mode corresponding to the first and second projections based on the preset correspondence between the first and second projections and the sound volume and adjusting the sound volume based on the sound volume adjustment mode further comprises:

subtracting the length of the second projection in the vertical direction from the length of the first projection in the horizontal direction, and determining a valid projection of the sliding track based on a determination whether the subtraction result is positive or negative; wherein the valid projection is the first projection in the horizontal direction or the second projection in the vertical direction; and determining the sound volume adjustment mode corresponding to the direction of the valid projection based on the correspondence between the first and second projections and the sound volume adjustment, and adjusting the sound volume based on the sound volume adjustment mode.

2. The method for adjusting the sound volume of the terminal of claim 1, wherein detecting the sliding action generated by triggering the touch screen in real time when the terminal is in the calling state and determining whether the sliding action is valid further comprises:

detecting the sliding action generated by triggering the touch screen in real time when the terminal is in the calling state;

acquiring a sliding track of the sliding action when the sliding action is detected; and comparing the sliding track with a preset threshold in length to determine whether the sliding action is valid; wherein when the length of the sliding track is greater than or equal to the preset threshold, the sliding action is determined to be valid.

3. The method for adjusting the sound volume of the terminal of claim 2, wherein acquiring the sliding track of the sliding action when the sliding action is detected further comprises:

when the sliding action is detected, acquiring coordinates of the touch points corresponding to the sliding action; and calculating the length of the sliding track corresponding to the sliding action based on the coordinates of the touch points; wherein the sliding track is a line segment formed by a starting point and a current point.

4. The method for adjusting the sound volume of the terminal of claim 2, wherein acquiring the first projection in the horizontal direction and the second projection in the vertical direction when the sliding action is valid further comprises:

when the sliding action is valid, projecting the sliding track respectively in the horizontal direction and the vertical direction; and calculating directions and lengths respectively of the first projection in the horizontal direction and the second projection in the vertical direction.

5. The method for adjusting the sound volume of the terminal of claim 1, wherein subtracting the length of the second projection in the vertical direction from the length of the first projection in the horizontal direction and determining the valid projection of the sliding track based on the determination whether the subtraction result is positive or negative further comprises:

subtracting the length of the second projection in the vertical direction from the length of the first projection in the horizontal direction; determining that the first projection in the horizontal direction is the valid projection when the subtraction result is positive, and determining that the second projection in the vertical direction is the valid projection when the subtraction result is negative.

6. The method for adjusting the sound volume of the terminal of claim 5, wherein a first variation of the first projection of the sliding track is defined as $\Delta x$, and a second variation of the second projection of the sliding track is defined as $\Delta y$, and $\Delta x = x2 - x1$, $\Delta y = y2 - y1$;

wherein when $|\Delta x| > |\Delta y|$ and $\Delta x > 0$, the sliding action is determined to be a horizontal right slipping;

when $|\Delta x| > |\Delta y|$ and $\Delta x < 0$, the sliding action is determined to be a horizontal left slipping;

when $|\Delta y| > |\Delta x|$ and $\Delta y > 0$, the sliding action is determined to be a vertical upward slipping; and when $|\Delta y| > |\Delta x|$ and $\Delta y < 0$, the sliding action is determined to be a vertical downward slipping.

7. The method for adjusting the sound volume of the terminal of claim 6, further comprising:

when the sliding action is the horizontal left slipping, reducing the sound volume of a microphone of the terminal;

when the sliding action is the horizontal right slipping, increasing the sound volume of the microphone;

when the sliding action is the vertical upward slipping, reducing the sound volume of an earpiece of the terminal; and when the sliding action is the vertical downward slipping, increasing the sound volume of the earpiece.

8. A terminal, comprising a touch screen and a processor having programs stored therein; wherein the processor is configured to:

detect a sliding action generated by triggering the touch screen in real time when the terminal is in a calling state, and determine whether the sliding action is valid;

acquire a first projection of a sliding track of the sliding action in a horizontal direction and a second projection of the sliding track of the sliding action in a vertical direction when the sliding action is determined to be valid; and adjust the sound volume based on a preset correspondence between the first and second projections and the sound volume;

wherein the processor is further configured to:

subtract the length of the second projection in the vertical direction from the length of the first projection in the horizontal direction, and determine a valid projection of the sliding track based on a determination whether the subtraction result is positive or negative; wherein the valid projection is the first projection in the horizontal direction or the second projection in the vertical direction; and determine a sound volume adjustment mode corresponding to the direction of the valid projection based on the correspondence between the first and second projections and the sound volume adjustment, and adjust the sound volume based on the sound volume adjustment mode.

9. The terminal of claim 8, wherein the processor is further configured to:

detect the sliding action generated by triggering the touch screen in real time when the terminal is in the calling state;

acquire a sliding track of the sliding action when the sliding action is detected; and compare the sliding track with a preset threshold in length to determine whether the sliding action is valid, wherein when the length of the sliding track is greater than or equal to the preset threshold, the sliding action is determined to be valid.

10. The terminal of claim 9, wherein the processor is further configured to:

acquire coordinates of touch points corresponding to the sliding action when the sliding action is detected; and calculate the length of the sliding track corresponding to the sliding action based on the coordinates of the touch points, wherein the sliding track is a line segment formed by a starting point and a current point.

11. The terminal of claim 8, wherein the processor is further configured to:

project the sliding track in a horizontal direction and a vertical direction when the sliding action is valid; and calculate directions and lengths of the first projection in the horizontal direction and the second projection in the vertical direction based on the sliding track.

12. The terminal of claim 8, wherein a first variation of the first projection of the sliding track is defined as $\Delta x$, and a second variation of the second projection of the sliding track is defined as $\Delta y$, and $\Delta x=x2-x1$, $\Delta y=y2-y1$;

when $|\Delta x|>|\Delta y|$ and $\Delta x>0$, the sliding action is determined to be a horizontal right slipping;

when $|\Delta x|>|\Delta y|$ and $\Delta x<0$, the sliding action is determined to be a horizontal left slipping;

when $|\Delta y|>|\Delta x|$ and $\Delta y>0$, the sliding action is determined to be a vertical upward slipping; and when $|\Delta y|>|\Delta x|$ and $\Delta y<0$, the sliding action is determined to be a vertical downward slipping.

13. The terminal of claim 12, further comprising a microphone and an earpiece; wherein the processor is further configured to:

when the sliding action is the horizontal left slipping, reduce the sound volume of the microphone;

when the sliding action is the horizontal right slipping, increase the sound volume of the microphone;

when the sliding action is the vertical upward slipping, reduce the sound volume of the earpiece; and when the sliding action is the vertical downward slipping, increase the sound volume of the earpiece.

14. A non-transitory tangible computer-readable storage medium for storing computer program code, wherein when the computer program code is executed by a processor, causes the processor to execute a method for adjusting a sound volume of a terminal, wherein the method comprises:

detecting a sliding action generated by triggering a touch screen of the terminal in real time when the terminal is in a calling state, and determining whether the sliding action is valid;

when the sliding action is determined to be valid, acquiring a first projection of a sliding track of the sliding action in a horizontal direction and a second projection of the sliding track of the sliding action in a vertical direction; and acquiring a sound volume adjustment mode corresponding to the first and second projections based on a preset correspondence between the first and second projections and the sound volume, and adjusting the sound volume based on the sound volume adjustment mode;

wherein the acquiring the sound volume adjustment mode corresponding to the first and second projections based on the preset correspondence between the first and second projections and the sound volume and adjusting the sound volume based on the sound volume adjustment mode further comprises:

subtracting the length of the second projection in the vertical direction from the length of the first projection in the horizontal direction, and determining a valid projection of the sliding track based on a determination whether the subtraction result is positive or negative; wherein the valid projection is the first projection in the horizontal direction or the second projection in the vertical direction; and determining the sound volume adjustment mode corresponding to the direction of the valid projection based on the correspondence between the first and second projections and the sound volume adjustment, and adjusting the sound volume based on the sound volume adjustment mode.

15. The storage medium of claim 14, wherein detecting the sliding action generated by triggering the touch screen in real time when the terminal is in the calling state and determining whether the sliding action is valid further comprises:

detecting the sliding action generated by triggering the touch screen in real time when the terminal is in the calling state;

acquiring a sliding track of the sliding action when the sliding action is detected; and comparing the sliding track with a preset threshold in length to determine whether the sliding action is valid; wherein when the length of the sliding track is greater than or equal to the preset threshold, the sliding action is determined to be valid.

16. The storage medium of claim 15, wherein acquiring the sliding track of the sliding action when the sliding action is detected further comprises:

when the sliding action is detected, acquiring coordinates of the touch points corresponding to the sliding action; and calculating the length of the sliding track corresponding to the sliding action based on the coordinates of the touch points; wherein the sliding track is a line segment formed by a starting point and a current point.

17. The storage medium of claim 15, wherein acquiring the first projection in the horizontal direction and the second projection in the vertical direction when the sliding action is valid further comprises:

when the sliding action is valid, projecting the sliding track respectively in the horizontal direction and the vertical direction; and calculating directions and lengths respectively of the first projection in the horizontal direction and the second projection in the vertical direction.

* * * * *